(12) United States Patent
Bellis et al.

(10) Patent No.: US 9,174,163 B2
(45) Date of Patent: Nov. 3, 2015

(54) HYDROCARBON TRAP AND METHOD FOR MANUFACTURE

(71) Applicant: Ford Global Technologies, LLC, Dearborn, MI (US)

(72) Inventors: Andrew George Bellis, Plymouth, MI (US); Roger Khami, Troy, MI (US); David S. Moyer, Sterling Heights, MI (US); Erik Henry Hermann, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 583 days.

(21) Appl. No.: 13/657,544

(22) Filed: Oct. 22, 2012

(65) Prior Publication Data
US 2014/0109878 A1    Apr. 24, 2014

(51) Int. Cl.
*F02M 25/08* (2006.01)
*F02M 33/02* (2006.01)
*B01D 53/04* (2006.01)
*B01J 20/32* (2006.01)

(52) U.S. Cl.
CPC ....... *B01D 53/0407* (2013.01); *F02M 25/0854* (2013.01); *B01D 2253/102* (2013.01); *B01D 2253/108* (2013.01); *B01D 2253/20* (2013.01); *B01D 2253/25* (2013.01); *B01D 2257/702* (2013.01); *B01D 2259/4516* (2013.01)

(58) Field of Classification Search
CPC ....... F02M 25/08; F02M 33/02; F02M 33/00; B01D 2253/102; B01D 2253/20; B01D 2253/25; B01D 2253/108; B01D 53/0407

USPC .......................................................... 123/519
See application file for complete search history.

(56) References Cited

U.S. PATENT DOCUMENTS

| | | | |
|---|---|---|---|
| 3,092,091 A * | 6/1963 | Bosley ......................... 123/574 |
| 5,837,039 A | 11/1998 | LeConey et al. |
| 6,936,093 B2 | 8/2005 | Isogawa et al. |
| 7,610,904 B2 | 11/2009 | Treier et al. |
| 8,191,539 B2 | 6/2012 | Bellis |
| 8,333,063 B2 * | 12/2012 | Elwart et al. .................. 123/519 |
| 2002/0104299 A1 | 8/2002 | Chang |
| 2005/0145224 A1 | 7/2005 | Zulauf et al. |
| 2006/0185651 A1 | 8/2006 | Hagler |
| 2009/0282793 A1 | 11/2009 | Tomlin et al. |
| 2010/0065030 A1 | 3/2010 | Bellis |
| 2010/0089368 A1 | 4/2010 | Hirata et al. |
| 2010/0089372 A1 | 4/2010 | Bellis et al. |
| 2011/0023719 A1 | 2/2011 | Kidman et al. |

OTHER PUBLICATIONS

Bellis, Andrew George, "Induction System Including a Passive-Adsorption Hydrocarbon Trap," U.S. Appl. No. 13/456,615, filed Apr. 26, 2012, 34 pages.

* cited by examiner

*Primary Examiner* — Hieu T Vo
(74) *Attorney, Agent, or Firm* — Julia Voutyras; Alleman Hall McCoy Russell & Tuttle LLP

(57) ABSTRACT

A hydrocarbon (HC) trap positioned in an intake conduit of an engine is provided. The HC trap includes a stack of consecutively layered polymeric sheets with at least a portion of the sheets impregnated with a HC vapor adsorption/desorption material, the stack of sheets extending from a first exterior surface to a second exterior surface.

22 Claims, 4 Drawing Sheets

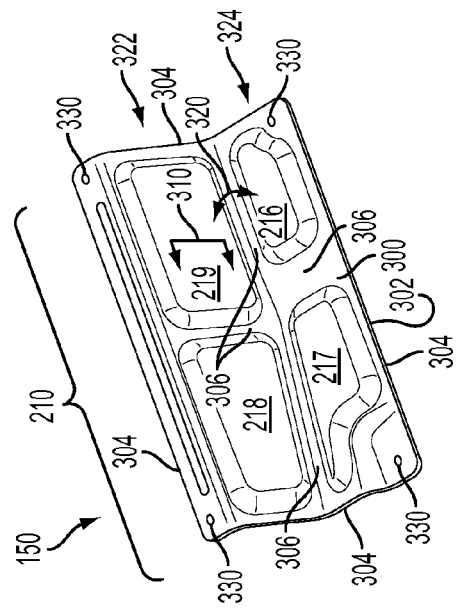
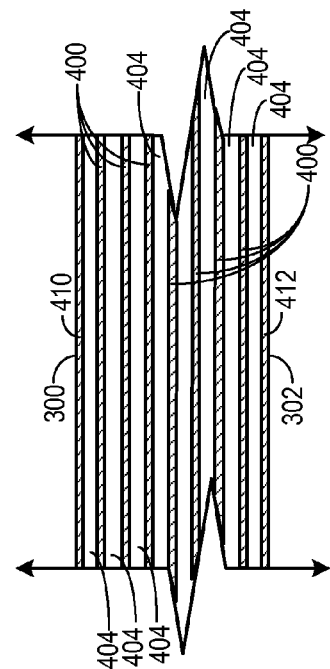
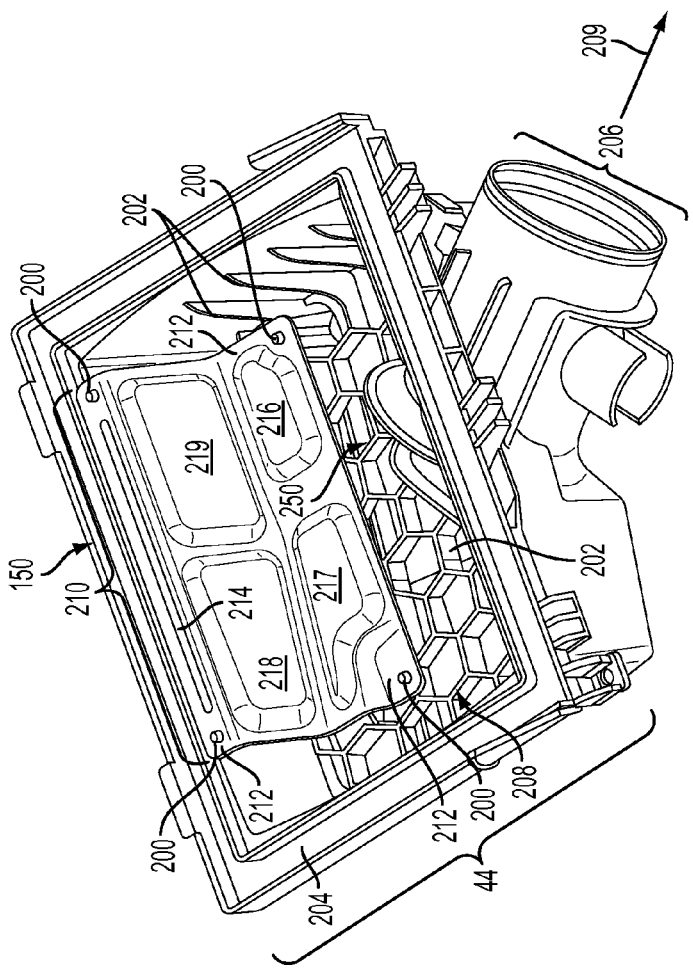

HYDROCARBON TRAP AND METHOD FOR MANUFACTURE

FIELD

The present disclosure relates to a hydrocarbon trap in an intake system of an engine.

BACKGROUND AND SUMMARY

Hydrocarbon (HC) vapors may emanate from the interior of an engine and escape through the engine's intake system. Therefore, HC traps are used in internal combustion engines to capture hydrocarbon vapors which may be otherwise leaked into the environment surrounding the engine. HC traps therefore reduce emissions (e.g., evaporative emission) from the engine.

US 2005/0145224 discloses an evaporative emission storage device having HC adsorption/desorption material positioned between porous polymeric layers. Hydrocarbon vapors may flow through the porous polymeric layers and into the HC adsorption/desorption material where the vapor is stored. The Inventors have recognized several drawbacks with the evaporative emission storage device disclosed in US 2005/0145224. Firstly, filling the area between the porous polymeric layers with adsorption material may involve a complicated and costly manufacturing process, increasing the cost of the vehicle. Additionally, the polymeric layers surrounding the adsorption material may limit the flow rate of the HC vapor into and/or out of the adsorption material. As a result, the amount of HC vapors captured by the storage device may be reduced, which may increase emissions (e.g., evaporative emissions). Furthermore, the profile of the HC trap may be increased when the polymeric material is used to enclose adsorption material. Still further, it may be difficult to provide a desired amount of rigidity to the storage device via the porous polymeric layers while at the same time providing the desired adsorption and/or desorption rate of the HC vapor in the storage device. Therefore, tradeoffs between desired characteristic in the storage device disclosed in US 2005/0145224 may be necessitated.

The Inventors herein have recognized the above issues and developed a hydrocarbon (HC) trap for an intake system of an engine. The HC trap includes a stack of consecutively layered polymeric sheets at least a portion of the sheets impregnated with a HC vapor adsorption/desorption material, the stack of sheets extending from a first exterior surface to a second exterior surface.

The polymeric sheets serve multiple uses, providing structural integrity to the HC trap and providing HC adsorption via the adsorption/desorption material embedded within the sheets. Consequently, the adsorption and/or desorption rate of HC vapors in the HC trap may be increased when HC adsorption material is integrated into the polymeric sheets. Moreover, the profile of the HC trap may be reduced, if desired, when the sheets provide both structural integrity as well as adsorption/desorption functionality. Furthermore, the cost of the HC trap may be reduced when the polymeric sheets serve multiple purposes.

In one example, there may be no intervening adsorption/desorption material positioned between the sheets, such as carbon pellets. In this way, the cost of the HC trap may be reduced via a reduction in materials in the trap. It will be appreciated that the manufacturing cost of the HC trap may be reduced when the sheets are impregnated with HC vapor adsorption/desorption material and there is no adsorption/desorption material positioned between the sheets, due to the elimination of a step of filling the area between the sheets with loose adsorption/desorption material.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

BRIEF DESCRIPTION OF THE DRAWINGS

FIG. 2 shows an illustration of a HC trap in an intake conduit;

FIG. 3 shows an illustration of the HC trap shown in FIG. 2;

FIG. 4 shows a cross-sectional view of a portion of the HC trap shown in FIG. 3;

FIGS. 2-3 are drawn approximately to scale, however other relative dimensions may be used if desired.

DETAILED DESCRIPTION

The following description relates to a hydrocarbon (HC) trap and method for manufacture of a HC trap. The HC trap may include a stack of consecutively layered polymeric sheets impregnated with HC vapor adsorption/desorption material. In this way, a single medium (i.e., the stack of sheets) may provide both adsorption functionality as well as structural integrity to the HC trap. Specifically in some examples, no intervening adsorption/desorption material is positioned between adjacent polymeric sheets in the stack of sheets. In this way, the complexity of the HC trap may be reduced when compared to traps with adsorption/desorption material positioned within the trap. As a result, the manufacturing cost of the HC trap is reduced. Moreover, the profile of the HC trap may be reduced, if desired, when the stack of sheets serves multiple uses.

Figure 1:
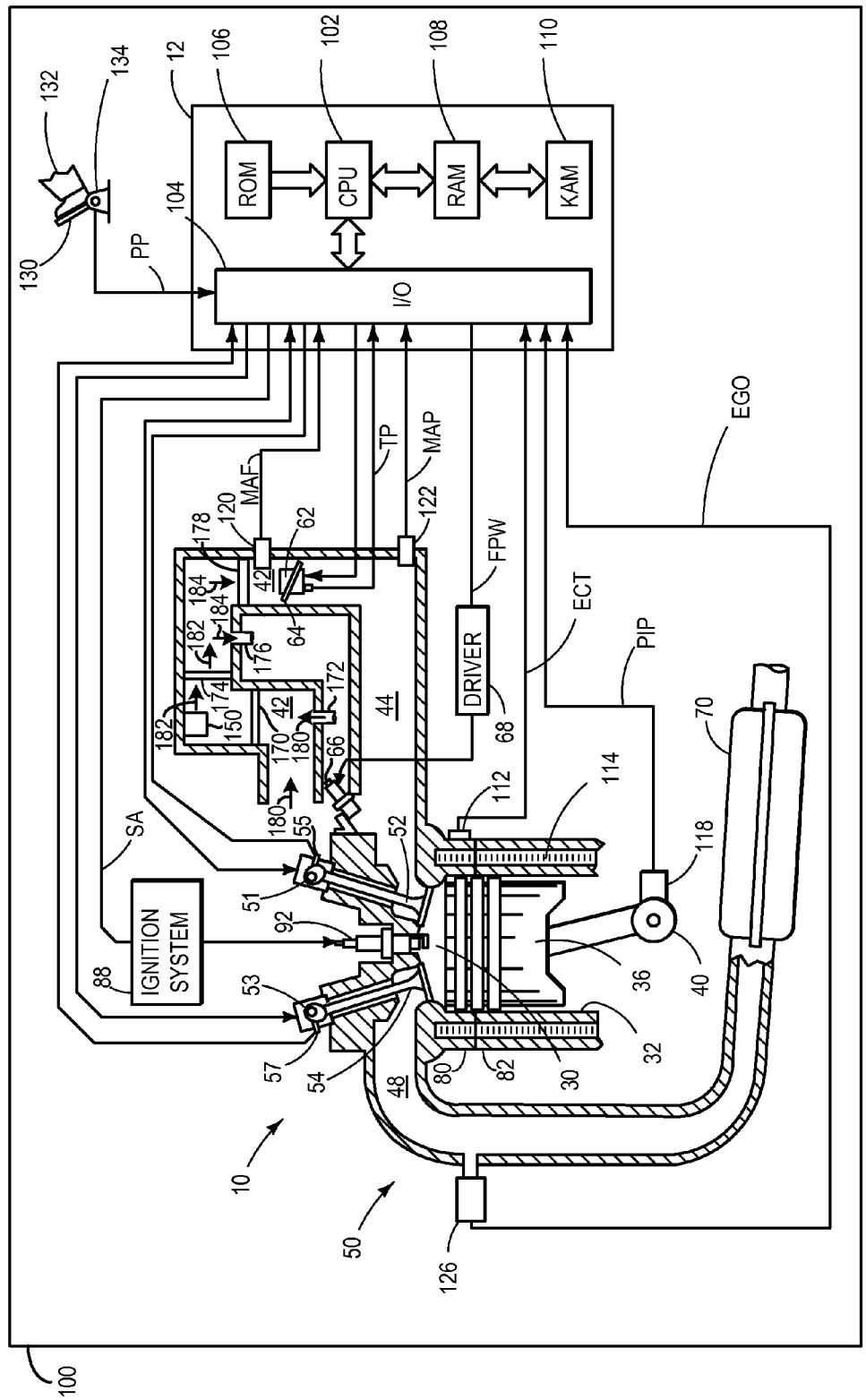
FIG. 1 shows a schematic depiction of an engine including a vapor purge system.

FIG. 1 is a schematic diagram showing one cylinder of multi-cylinder engine 10, which may be included in a propulsion system of a vehicle 100 in which an exhaust gas sensor 126 (e.g., air-fuel sensor) may be utilized to determine an air fuel ratio of exhaust gas produce by engine 10. The air fuel ratio (along with other operating parameters) may be used for feedback control of engine 10 in various modes of operation. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Cylinder (i.e., combustion chamber) 30 of engine 10 may include combustion chamber walls 32 with piston 36 positioned therein. A cylinder head 80 is coupled to a cylinder block 82 to form the cylinder 30.

Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Cylinder 30 may receive intake air from intake manifold 44 via intake conduit 42 and may exhaust combustion gases via exhaust passage 48. The intake manifold 44 may include an intake manifold, in some examples. Intake manifold 44 and exhaust passage 48 can selectively communicate with cylinder 30 via respective intake valve 52 and exhaust valve 54. In some embodiments, cylinder 30 may include two or more intake valves and/or two or more exhaust valves. A throttle 62 including a throttle plate 64 is positioned in the intake conduit 42. The throttle is configured to adjust the amount of airflow flowing to the cylinder 30.

In this example, intake valve 52 and exhaust valves 54 may be actuated via an intake cam 51 and an exhaust cam 53. In some examples, the engine 10 may include a variable cam timing system configured to adjust (advance or retard) cam timing. The position of intake valve 52 and exhaust valve 54 may be determined by position sensors 55 and 57, respectively.

Fuel injector 66 is shown arranged in intake manifold 44 in a configuration that provides what is known as port injection of fuel into the intake port upstream of cylinder 30. Fuel injector 66 may inject fuel in proportion to the pulse width of signal FPW received from controller 12 via electronic driver 68. In some examples, cylinder 30 may alternatively or additionally include a fuel injector coupled directly to cylinder 30 for injecting fuel directly therein, in a manner known as direct injection.

Ignition system 88 can provide an ignition spark to cylinder 30 via spark plug 92 in response to spark advance signal SA from controller 12, under select operating modes. Though spark ignition components are shown, in some embodiments, cylinder 30 or one or more other combustion chambers of engine 10 may be operated in a compression ignition mode, with or without an ignition spark.

Exhaust gas sensor 126 is shown coupled to exhaust passage 48 of exhaust system 50 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. In some examples, exhaust gas sensor 126 may be a first one of a plurality of exhaust gas sensors positioned in the exhaust system. For example, additional exhaust gas sensors may be positioned downstream of emission control device 70.

Emission control device 70 is shown arranged along exhaust passage 48 downstream of exhaust gas sensor 126. Emission control device 70 may be a three way catalyst (TWC), NOx trap, various other emission control devices, or combinations thereof. In some examples, emission control device 70 may be a first one of a plurality of emission control devices positioned in the exhaust system. In some examples, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory 106 (e.g., memory chip) in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

During operation, the cylinder 30 in the engine 10 typically undergoes a four stroke cycle: the cycle includes the intake stroke, compression stroke, expansion stroke, and exhaust stroke. In a multi-cylinder engine the four stroke cycle may be carried out in additional combustion chambers. During the intake stroke, generally, exhaust valve 54 closes and intake valve 52 opens. Air is introduced into cylinder 30 via an intake manifold, for example, and piston 36 moves to the bottom of the combustion chamber so as to increase the volume within cylinder 30. The position at which piston 36 is near the bottom of the combustion chamber and at the end of its stroke (e.g. when cylinder 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within cylinder 30. The point at which piston 36 is at the end of its stroke and closest to the cylinder head (e.g. when cylinder 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition devices such as a spark plug 92, resulting in combustion. Additionally or alternatively compression may be used to ignite the air/fuel mixture. During the expansion stroke, the expanding gases push piston 36 back to BDC. A crankshaft may convert piston movement into a rotational torque of the rotary shaft. Finally, during the exhaust stroke, exhaust valve 54 opens to release the combusted air-fuel mixture to an exhaust manifold and the piston returns to TDC. Note that the above is described merely as an example, and that intake and exhaust valve opening and/or closing timings may vary, such as to provide positive or negative valve overlap, late intake valve closing, or various other examples. Additionally or alternatively compression ignition may be implemented in the cylinder 30.

FIG. 1 also shows a HC trap 150 positioned in the intake conduit 42. Thus, the HC trap 150 is positioned upstream of the throttle 62. However, other suitable HC trap positions have been contemplated. The HC trap 150 may be configured to adsorb HC vapors. The HC trap 150 is configured to adsorb and desorb HC vapors in the intake manifold 44. It will be appreciated that the HC trap 150 reduces emissions (e.g., evaporative emissions) in the vehicle and captures HC vapors that may otherwise flow into the surrounding environment, during for example engine shut-down. The HC trap 150 is depicted as a box in FIG. 1. However, detailed characteristics of the HC traps are discussed in greater detail herein with regard to FIGS. 2-4.

An air filter 170 may also be positioned in the intake conduit 42. The air filter 170 is configured to remove particulates from air flowing through the intake conduit 42. The air filter 170 spans the intake conduit in the depicted example. However, other air filter configurations have been contemplated.

A drain 172 opening into the intake conduit 42 may also be included in the engine 10. The drain 172 is configured to drain condensation from the intake conduit 42. The outlet of the drain may be positioned external to the engine 10, in some examples. As shown, the drain 172 is positioned below the HC trap 150. However, other drain positions have been contemplated.

A second HC trap 174 may also be positioned in the intake conduit 42 downstream of the HC trap 150. The second HC trap 174 spans the intake conduit 42 in the depicted example and therefore may be referred to as a flow-through HC trap. However, other configurations of the second HC trap have been contemplated. Further in some examples, the second HC trap 174 may be omitted from the engine 10. A positive crankcase ventilation (PCV) port 176 opening into the intake conduit 42 may also be included in the engine 10. The PCV port 176 may be in fluidic communication with a crankcase in the engine 10. A cooler 178 may also be positioned in the intake conduit 42. The cooler 178 may be included in the engine 10 when the engine is boosted via a compressor. It will be appreciated that in other examples the engine 10 may not include the cooler 178.

Arrows 180 depict the general flow of intake air through the engine's intake system during engine operation when the engine is performing combustion. FIG. 1 shows the engine during purging of the HC trap 150 and the second HC trap 174 when HC vapors desorb from the HC traps. As shown, intake air travels through the air filter 170. Air also enters the intake conduit 42 from the drain 172. Arrows 182 denote the general flow of HC vapors. As shown, HC vapors may flow from the HC trap 150 and the second HC trap 174 in a downstream direction toward the throttle 62 during engine operation. Arrows 184 denote the general flow of HC vapors and intake air downstream of the second HC trap 174. As shown, intake air and HC vapors flow into the PCV port 176 and downstream toward the throttle 62. It will be appreciated that arrows 180, 182, and 184 generally depict the direction of gas flow. However, the pattern of intake air-flow and HC vapor-flow during engine operation may have additional complexity that is not depicted.

Figure 6:
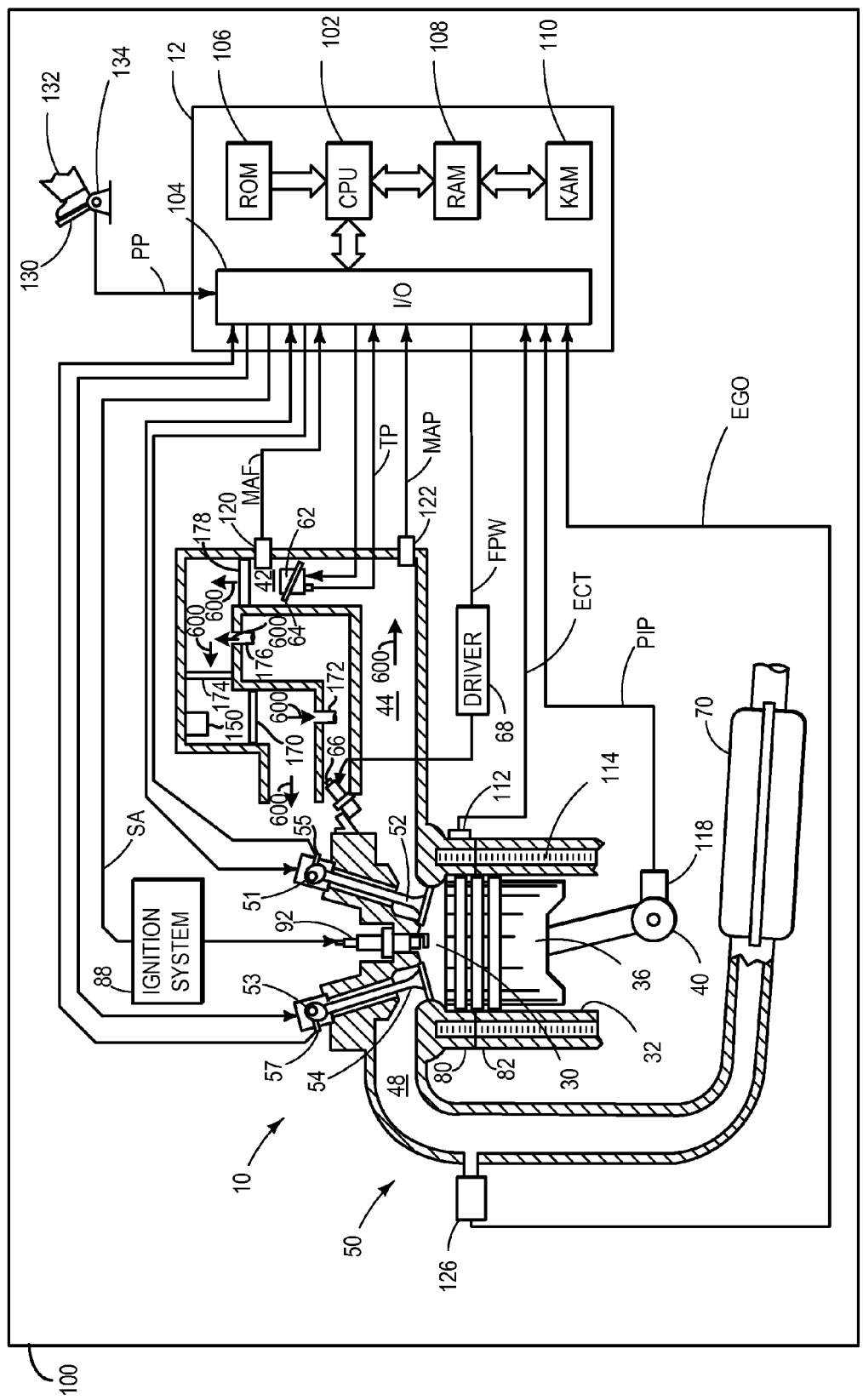
FIG. 6 shows the intake gas-flow pattern in the engine shown in FIG. 1 during engine shut-down.

FIG. 6 shows the engine 10 and vehicle shown in FIG. 1 during engine shut-down when the engine is not performing combustion. Therefore, similar parts are labeled accordingly. Thus, FIG. 6 shows the engine 10 during loading of the HC trap 150 and the second HC trap 174 when HC vapors adsorb into the HC traps. Arrows 600 depict the general flow of HC vapors in the intake system during engine shut-down when the engine is not performing combustion.

It will be appreciated that HC vapors may flow from the combustion chamber 30 to the intake manifold 44 from the intake manifold 44 to the intake conduit 42. As shown, HC vapors also flow from the PCV port 176 into the intake conduit 42. The HC vapors may flow through the second HC trap 174 where a portion of the HC vapors may adsorb into the trap. Additionally, HC vapors may flow past the HC trap 150 which may also adsorb a portion of the HC vapors. Some HC vapors may also flow out of the drain 172 and the intake conduit 42 into the surrounding environment. However, it will be appreciated that the HC trap 150 and the second HC trap 174 may adsorb a large portion of the HC vapors, thereby reducing evaporative emissions.

FIG. 2 shows an illustration of an example HC trap 150 in an upper half of an air box which may be part of the intake conduit 42, shown in FIG. 1. The air box cover 250 is positioned upstream of the throttle 62, shown in FIG. 1, in the depicted example. However, in other examples the HC trap 150 and/or the second HC trap 174 shown in FIG. 1, may be positioned downstream of the throttle.

The air box cover 250 includes structural reinforcing webbing 202. The structural reinforcing webbing 202 may increase the structural integrity of air box cover 250. The air box cover 250 further includes a flange 204 which may be mated to the air filter located between the upper and lower halfs of the air box. The air box cover 250 further includes an inlet 208 and an outlet 206. Arrow 209 denotes the flow of intake air into the air box cover 250 during engine operation when the engine is performing combustion. However, it will be appreciated that during engine shut-down air may flow in the opposing direction. The outlet 206 may have a smaller cross-sectional area than the inlet 208. However, other geometries and sizes of the air box cover have been contemplated. It will be appreciated that the air box cover 250 is positioned upstream of the throttle 62, shown in FIG. 1.

The HC trap 150 is coupled to the air box cover 250 via fasteners 200. Heat stakes are shown coupling the HC trap to the intake conduit in the depicted example. Specifically, the heat stakes extend through openings in the HC trap 150. Additionally or alternatively, sonic welds may also be used to couple the HC trap to the air box cover. However, other suitable fasteners or attachment apparatuses may be used such as screws, bolts, adhesive, etc.

The HC trap 150 in FIG. 1 has a structure 210 as depicted in FIGS. 2 & 3. The HC trap structure 210 may be configured to adsorb and desorb HC vapors in the air box cover 250. Continuing with FIG. 2, the HC trap 150 includes flanges 212. One of the flanges 212 includes a reinforcing rib 214.

The HC trap further includes raised sections 216, 217, 218, and 219. The size and geometry of the raised sections (216, 217, 218, and 219) varies. It will be appreciated that the variation in size and/or geometry of the raised sections may be selected based on air-flow patterns in the air box cover 250. This may enable the HC adsorption/desorption rate of the HC trap to be varied and allow improvements to reduce air flow turbulence.

FIG. 3 shows a detailed illustration of the HC trap 150 shown in FIG. 2. As discussed above with regard to FIG. 2, FIG. 3 depicts the HC trap structure 210. The HC trap structure 210 includes a first exterior surface 300 and a second exterior surface 302. The second exterior surface is positioned underneath the first exterior surface in the depicted example. However, other relative positions have been contemplated. It will be appreciated that intake air and HC vapors may flow across the first exterior surface 300 and the second exterior surface 302 in the air box cover 250, shown in FIG. 2, during some engine operating conditions, such as during engine shut-down. A stack of consecutively arranged polymeric sheets may be positioned between the first exterior surface 300 and the second exterior surface 302. The intermediate polymeric sheets are discussed in greater detail herein. Continuing with FIG. 3, portions of the raised sections (216, 217, 218, and 219) are included in the first exterior surface 300.

The first exterior surface 300 and the second exterior surface 302 may define a boundary of the HC trap structure 210.

Edges 304 of sheets positioned between the first exterior surface 300 and the second exterior surface form a peripheral boundary of the adsorption structure 210. In some examples, each of the sheets included in the stack of sheets extends to the edges 304 of the HC trap structure 210. However, other sheet configurations have been contemplated. Thus, the first and second exterior surfaces and edges of the stack of sheets form a boundary of the HC trap structure, in the depicted example.

The first exterior surface 300 and/or second exterior surface 302 may include a base polymeric material impregnated with a HC vapor adsorption/desorption material. The use of multiple thermoformed polymeric material sheets provides structural integrity to the HC trap while retaining the adsorption/desorption functionality via the impregnated HC vapor adsorption/desorption material. In this way, the base polymeric material provides multiple functions. As a result, the cost and/or profile of the HC trap may be reduced, if desired.

The polymeric material may be non-woven polyester and the HC vapor adsorption/desorption material may be activated carbon, in some examples. Additionally or alternatively, the HC vapor adsorption/desorption material may include carbon, activated carbon, zeolites, hydrophobic cellulose, silicon oils, cyclodextrins, and/or any other suitable adsorption/desorption material. Specifically, in some examples the first exterior surface 300 may include substantially identical materials to the second exterior surface 302. However, in other examples, the first exterior surface and the second exterior surface may comprise different materials. Cutting plane 310 defines the cross-section shown in FIG. 4.

The first exterior surface 300 may be the surface of a first sheet (e.g., first polymeric sheet) and the second exterior surface may be the surface of a second sheet (e.g., second polymeric sheet). The HC trap structure 210 may also include a plurality of sheets positioned between the first exterior surface 300 and the second exterior surface 302, as previously discussed. The sheets positioned between the first and second exterior surfaces may include similar materials such as a polymeric material impregnated with HC vapor adsorption/desorption material. The intermediary sheets are discussed in greater detail herein with regard to FIG. 4.

The HC trap structure 210 includes depressed sections 306. One or more of the polymeric sheets in the depressed sections may be in face sharing contact with adjacent sheets in the depressed sections 306. Specifically, in the depicted example all of the polymeric sheets are in face sharing contact with adjacent polymeric sheets in the depressed sections. In other words, each sheet in the stack of sheets may be in face sharing contact with an adjacent sheet. Thus, the depressed sections may extend through the entire stack of sheets. The sheets in the depressed sections 306 may be thermally coupled. Therefore, in such an example the depressed sections may be referred to as thermally coupled sections. Specifically, in the thermally coupled sections two or more sheets may be thermally bonded. In other examples, one or more of the sheets in the depressed sections may be spaced away from adjacent sheets. Further in some examples, the thermally coupled sections may retain the individual layers. It will be appreciated that the depressed sections may be thermoformed. That is to say that heat and/or pressure may be used to construct the depressed sections. Specifically in some examples, the whole HC trap 150 may be thermoformed. However, other HC trap construction techniques have been contemplated. Additionally, the depressed sections 306 traverse the HC trap 150. Furthermore, the thickness of the depressed sections 306 is less than the thickness of the raised sections (216, 217, 218, and 219). In some examples, the thermally coupled sections may retain individual layers. However, in other examples, the thermally coupled layers may be thermally coupled to form a continuous layer. Additionally, the thermally coupled section may provide enough rigidity such that additional supporting structures are not included in the HC trap, if desired. Furthermore, the thermally coupled sections may include attachment features for mounting and retention of the HC trap, such as the attachment features 330. In the depicted example, the attachment features are openings. However, other attachment features have been contemplated. Additionally, the thermally coupled sections may also provide alignment features and may provide fit to a three dimensional contoured surface, as shown in FIG. 2. The thermally coupled sections may also provide a desired amount of rigidity to reduce flutter of the adsorption material.

Continuing with FIG. 3, an angular separation 320 between a first portion 322 of the first exterior surface 300 and a second portion 324 of the first exterior surface is approximately 90°. However, other HC trap geometries have been contemplated. The HC trap 150 also includes openings 330 configured to receive coupling apparatuses, such as bolts for attaching the HC trap 150 to the air box cover 250, shown in FIG. 2.

Further in some examples, the thermoformed HC trap structure 210 provides enough rigidity such that additional supporting structures (e.g. cage) may not be used, if desired. In this way, the HC trap may have a desired amount of structural integrity simplifying the installation and/or replacement process. The HC trap 150 shown in FIG. 3 does not include any additional components, such as a frame. Consequently, the cost of the HC trap may be reduced. It will be appreciated that the HC trap structure 210 may provide a desired amount of structural integrity to the HC trap. Therefore, the HC trap may only include the HC trap structure 210, in some examples. However, additional components may be included in the HC trap in other examples, if desired.

FIG. 4 shows a cross-sectional view of the HC trap 150, shown in FIG. 3. As shown, a plurality of polymeric sheets 400 are positioned between the first exterior surface 300 and the second exterior surface 302. In this way, a stack of polymeric sheets extends from the first exterior surface 300 to the second exterior surface 302. As illustrated, the first exterior surface is included in a first exterior polymeric sheet 410 and the second exterior surface is included in a second exterior polymeric sheet 412. In this way a first polymeric sheet, included in the plurality of sheets 400, forms the first exterior surface 300 and a second polymeric sheet, included in the plurality of sheets, forms the second exterior surface 302.

Each of the polymeric sheets may comprise similar materials. For example, each of the polymeric sheets may be a non-woven polyester sheet impregnated with a HC vapor adsorption/desorption material such as activated carbon. However, in other examples, not all sheets in the stack may be impregnated and by this manner the thickness may be controlled without varying the adsorption/desorption characteristics. Therefore, only a portion of the sheets may be impregnated with HC vapor adsorption/desorption material, in some examples. As shown, each of the intermediary polymeric sheets 400 is spaced away from one another. However, in other examples two or more of the intermediary polymeric sheets may be in face sharing contact. Each of the polymeric sheets 400 has an equivalent thickness in the depicted example. However, in other examples, the thicknesses of the polymeric sheets may vary from sheet to sheet or vary along the length and/or width of each sheet.

The plurality of sheets 400 may be referred to as a stack of sheets. The plurality of sheets is consecutively layered and there may be no adsorption material positioned between the sheets. The stack of sheets 400 is formed into a single unitary rigid structure (i.e., the HC trap structure 210 shown in FIG. 3), in the depicted example. However, in other examples the stack of sheets may form multiple structures and/or one or more of the structures may be flexible. However, rigid structure(s) may be used in the HC trap to simplify installation and/or replacement. The adsorption/desorption material impregnated into the polymeric sheets may include carbon, activated carbon, zeolites, hydrophobic cellulose, silicon oils, and cyclodextrins. The spaces between sheets may not include loose adsorption particles such as carbon pellets, zeolites, hydrophobic cellulose, silicon oils, cyclodextrins, or other adsorption material. However, in other examples, loose adsorption/desorption material may be positioned between the sheets. Further in some examples the HC trap structure may not include adhesive between the sheets.

Specifically, in the depicted example, there is no intervening material positioned between the plurality of sheets included in the stack of sheets 400. In this way, the complexity of the HC trap may be reduced when compared to traps with loose adsorption material positioned between layers in the trap. As a result, the cost of the HC trap is reduced. Moreover, the profile of the HC trap may be reduced, if desired. As shown, gaps 404 are positioned between adjacent sheets in the plurality of sheets 400. The gaps may be filled with a gas such as air. In this way, no intervening material may be positioned within the gaps 404. It will be appreciated that the cross-section shown in FIG. 4 is a cross section of the raised section 219, shown in FIG. 3. Further it will be appreciated that the other raised sections may have a similar cross-section. Additionally, the depressed sections 306 shown in FIG. 3 may have smaller gaps between the sheets or adjacent sheets in the stack of sheets may be in face sharing contact. Further it will be appreciated that each of the sheets 400 may extend to the edges 304, shown in FIG. 3, in some examples. However in other examples, one or more of the sheets 400 may not extend to the edges 304, shown in FIG. 3.

Figure 5:
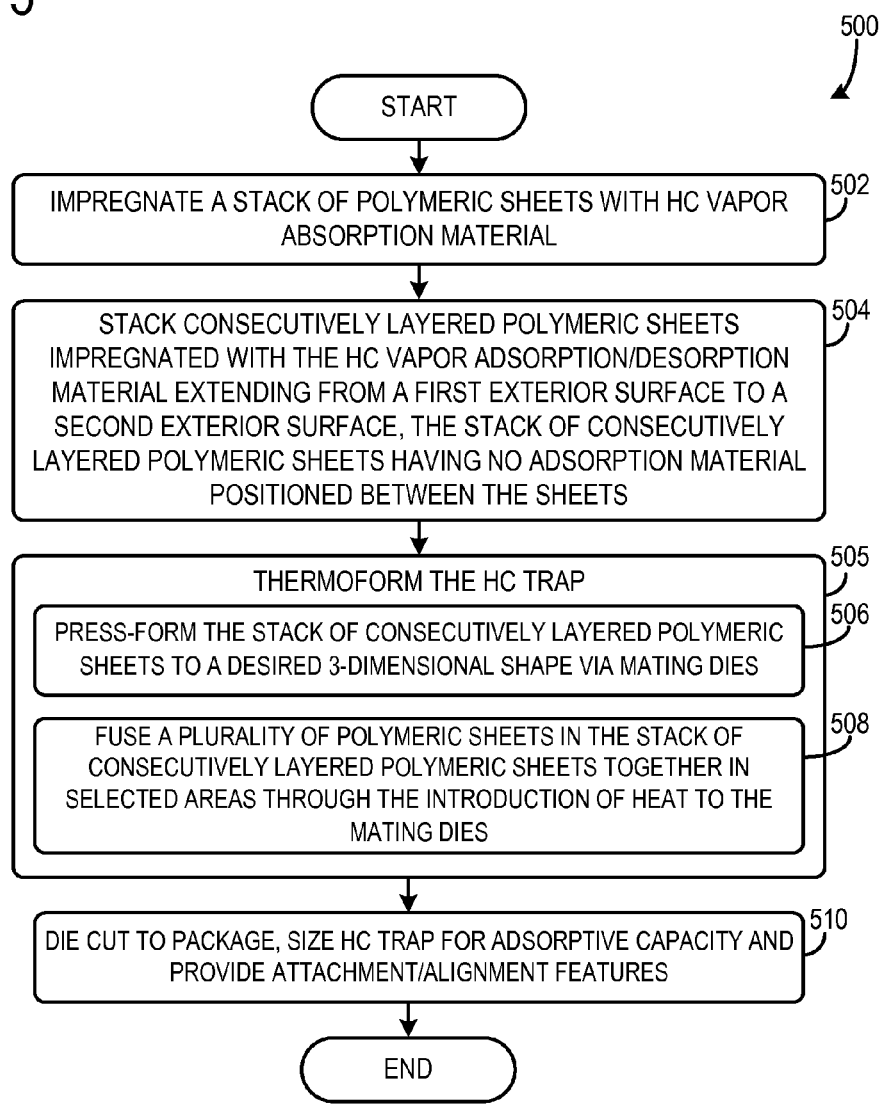
FIG. 5 shows a method for manufacturing a HC trap.

FIG. 5 shows a method 500 for manufacturing a HC trap. The method 500 may be used to construct the HC trap discussed above with regard to FIGS. 1-4 or may be used to construct another suitable HC trap.

At 502 the method includes impregnating a stack of polymeric sheets with the HC vapor adsorption/desorption material. Next at 504 the method includes stacking consecutively layered polymeric sheets impregnated with the HC vapor adsorption/desorption material extending from a first exterior surface to a second exterior surface, the stack of consecutively layered polymeric sheets having no adsorption material positioned between the sheets. At 505 the method includes thermoforming the HC trap. The HC trap includes the stack of consecutively layered polymeric sheets. Thermoforming the HC trap may include press-forming the stack of consecutively layered polymeric sheets to a desired 3-dimensional shape via mating dies at 506. Thermoforming the HC trap may also include at 508 fusing a plurality of polymeric sheets in the stack of consecutively layered polymeric sheets together in selected areas through the introduction of heat to the mating dies. In this way, rigidity may be provided to the HC trap in selected areas as well as bonding (e.g., permanently bonding) the multiple layers together. At 510 the method includes die cutting to package, size HC trap for adsorptive capacity and provide attachment/alignment features. Die cutting the HC trap may include die cutting the perimeter edges of the HC trap and/or die cutting attachment features (e.g., attachment openings) to package attach, size trap capacity, etc. Step 510 may be performed while the HC trap is in a thermoforming machine. Thus, the die cut may be edge fired during thermoforming to reduce edge fraying. Therefore, step 510 may be included in step 504, in some examples. As previously discussed, the sheets may be positioned adjacent to one another without any intervening material and the polymeric sheets may be non-woven polyester and the HC vapor adsorption/desorption material may be activated carbon. In this way, a simplified manufacturing process may be used to construct a HC trap which does not involve filling areas in the trap with loose adsorption/desorption material.

Various steps, acts, operations, etc., illustrated may be performed in the sequence illustrated, in parallel, or in some cases omitted. Likewise, the order of the steps is not necessarily required to achieve the features and advantages of the example embodiments described herein, but is provided for ease of illustration and description. One or more of the illustrated steps may be repeatedly performed depending on the particular method being used.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A hydrocarbon (HC) trap positioned in an intake conduit of an engine comprising:
a stack of consecutively layered polymeric sheets with at least a portion of the sheets impregnated with a HC vapor adsorption/desorption material, the stack of sheets extending from a first exterior surface to a second exterior surface.

2. The HC trap of claim 1, where the stack of sheets has no adsorption/desorption material positioned between the sheets, and wherein the sheets are formed into a unitary rigid structure.

3. The HC trap of claim 2, where the HC vapor adsorption/desorption material includes one or more of carbon, activated carbon, zeolites, hydrophobic cellulose, silicon oils, cyclodextrins or any other HC adsorbing/desorbing materials.

4. The HC trap of claim 2, where the HC vapor adsorption/desorption material includes loose adsorption particles.

5. The HC trap of claim 1, where the HC trap does not include adhesive between the sheets.

6. The HC trap of claim 1, where the sheets are non-woven polyester sheets and the HC vapor adsorption/desorption material is activated carbon.

7. The HC trap of claim 1, where a first polymeric sheet, included in the stack of sheets, forms the first exterior surface and a second polymeric sheet, included in the stack of sheets, forms the second exterior surface.

8. The HC trap of claim 1, where each sheet in the stack of sheets is in face sharing contact with an adjacent sheet.

9. The HC trap of claim 1, where the first and second exterior surfaces and edges of the stack of sheets form a boundary of the HC trap structure.

10. The HC trap of claim 1, where the stack of sheets includes a first raised section having at least one of a different size and geometry than a second raised section.

11. The HC trap of claim 1, where the stack of sheets includes a thermally coupled section traversing the HC trap structure and includes two or more thermally bonded sheets.

12. The HC trap of claim 11, where the thermally coupled section extends through the stack of sheets.

13. The HC trap of claim 11, where the thermally coupled section retains the individual layers and provides enough rigidity such that additional supporting structures are not included in the HC trap.

14. The HC trap of claim 11, where the thermally coupled section includes attachment features for mounting and retention of the HC trap and where the thermally coupled section provides alignment features.

15. The HC trap of claim 11, where the thermally coupled section provides fit to a three dimensional contoured surface.

16. A method for manufacturing a hydrocarbon (HC) trap comprising:
    thermoforming a HC trap including a stack of consecutively layered polymeric sheets impregnated with a HC vapor adsorption/desorption material extending from a first exterior surface to a second exterior surface, the stack of sheets having no adsorption/desorption material positioned between the sheets.

17. The method of claim 16, prior to the thermoforming, impregnating the stack of polymeric sheets with the HC vapor adsorption/desorption material.

18. The method of claim 16, where the sheets are positioned adjacent to one another without any intervening material.

19. The method of claim 16, where the polymeric sheets are non-woven polyester and the HC vapor adsorption/desorption material is activated carbon.

20. A hydrocarbon (HC) trap in an intake conduit of an engine comprising:
    a stack of consecutively layered non-woven polyester sheets impregnated with activated carbon extending from a first exterior surface to a second exterior surface, each of the sheets positioned adjacent to one another without any intervening adsorption/desorption material positioned between the sheets, the intervening adsorption/desorption material includes one or more of carbon, activated carbon, zeolites, hydrophobic cellulose, silicon oils, cyclodextrins, and any other HC adsorption/desorption material.

21. The HC trap of claim 20, where the stack includes a first raised section having a different size and/or geometry than a second raised section.

22. The HC trap of claim 20, where the sheets in the first and second raised sections have gaps between the sheets with no intervening material position within the gaps.

* * * * *